(12) United States Patent
Milner-Moore et al.

(10) Patent No.: US 11,353,703 B2
(45) Date of Patent: Jun. 7, 2022

(54) IMAGE PROCESSING VIA MULTI-SAMPLE ANTI-ALIASING

(71) Applicant: Sony Interactive Entertainment Inc., Tokyo (JP)

(72) Inventors: Jonathan Richard Milner-Moore, London (GB); Owen James Answer, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 364 days.

(21) Appl. No.: 16/489,517

(22) PCT Filed: Feb. 6, 2018

(86) PCT No.: PCT/GB2018/050330
§ 371 (c)(1),
(2) Date: Aug. 28, 2019

(87) PCT Pub. No.: WO2018/158555
PCT Pub. Date: Sep. 7, 2018

(65) Prior Publication Data
US 2020/0018965 A1    Jan. 16, 2020

(30) Foreign Application Priority Data
Mar. 1, 2017    (GB) ..................................... 1703288

(51) Int. Cl.
*G06K 9/40*       (2006.01)
*G02B 27/01*    (2006.01)
(Continued)

(52) U.S. Cl.
CPC ..... *G02B 27/0172* (2013.01); *G02B 27/0101* (2013.01); *G06T 11/40* (2013.01);
(Continued)

(58) Field of Classification Search
None
See application file for complete search history.

(56) References Cited

U.S. PATENT DOCUMENTS

| 10,325,347 B2 * | 6/2019 | Seong | G06T 3/403 |
| 2004/0056858 A1 * | 3/2004 | Ohba | G06T 15/02 |
| | | | 345/419 |

(Continued)

FOREIGN PATENT DOCUMENTS

EP    1731943 B1    2/2019

OTHER PUBLICATIONS

Combined Search and Examination Report for corresponding GB Application No. GB1703288.9, 2 pages dated Aug. 22, 2017.

(Continued)

*Primary Examiner* — Anh-Tuan V Nguyen
(74) *Attorney, Agent, or Firm* — Matthew B. Dernier, Esq.

(57) ABSTRACT

Methods and apparatus for an image generated for display by a head mountable display device include: defining a 2×2 pixel mask pattern for a region of the image, indicating the location of one or more pixels and corresponding masked pixels within the 2×2 pixel mask pattern; adapting a multi-sample anti-aliasing (MSAA) scheme to sample at one quarter resolution on a regular grid; sampling values using the adapted MSAA scheme to render the one or more respective pixels indicated by the 2×2 pixel mask, so as to generate a region of the image comprising one or more rendered pixels and corresponding missing pixels; and dilating one or more of the respective pixels to fill in the one or more missing pixels within the region of the image.

11 Claims, 18 Drawing Sheets

(51) Int. Cl.
 *G06T 11/40* (2006.01)
 *G06T 15/50* (2011.01)
(52) U.S. Cl.
 CPC ...... *G06T 15/503* (2013.01); *G02B 2027/014* (2013.01); *G02B 2027/0178* (2013.01)

(56) References Cited

U.S. PATENT DOCUMENTS

| | | | |
|---|---|---|---|
| 2004/0207642 A1* | 10/2004 | Crisu | G06T 11/203 345/626 |
| 2010/0157433 A1 | 6/2010 | Mukawa | |
| 2011/0135011 A1* | 6/2011 | Eddy | G06T 5/002 375/240.29 |
| 2014/0160155 A1* | 6/2014 | Berkovich | G06T 7/187 345/629 |
| 2014/0327696 A1 | 11/2014 | Pomianowski | |
| 2015/0138228 A1* | 5/2015 | Lum | G06T 15/005 345/611 |
| 2015/0287231 A1* | 10/2015 | Berghoff | G06T 15/405 345/422 |
| 2015/0379734 A1* | 12/2015 | Golas | G06T 15/005 345/597 |
| 2016/0284120 A1 | 9/2016 | Hasselgren | |
| 2017/0024840 A1* | 1/2017 | Holub | G06T 1/0028 |

OTHER PUBLICATIONS

International Search Report and Written Opinion for corresponding PCT Application No. PCT/GB2018/050330, 16 pages, dated Apr. 9, 2018.

Martin Weier et al: "Foveated Real-Time Ray Tracing for Head-Mounted Displays", Computer Graphics Forum, vol. 35. No. 7, 10 pages, dated Oct. 27, 2016.

Brian Guenter "Foveated 3D graphics", ACM Transactions on Graphics, vol. 31. No. 6, 10 pages, Nov. 1, 2012.

* cited by examiner

LEFT    RIGHT

FIG. 19A
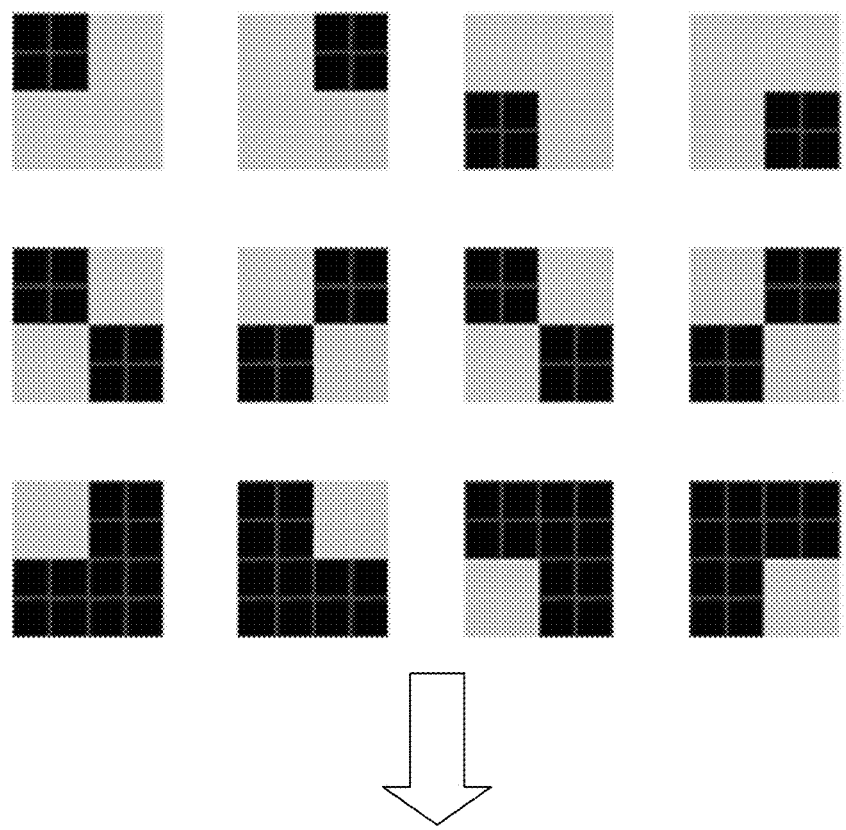
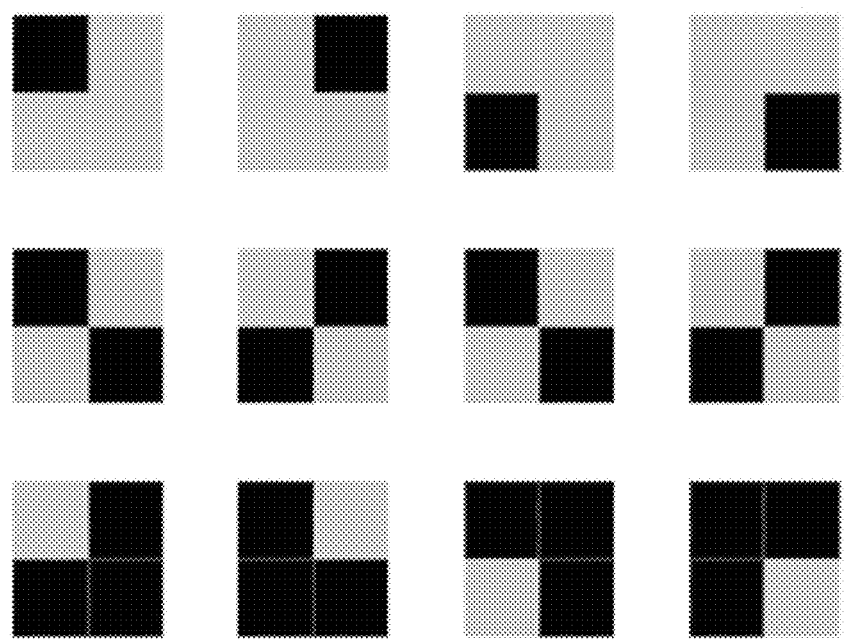
FIG. 19B

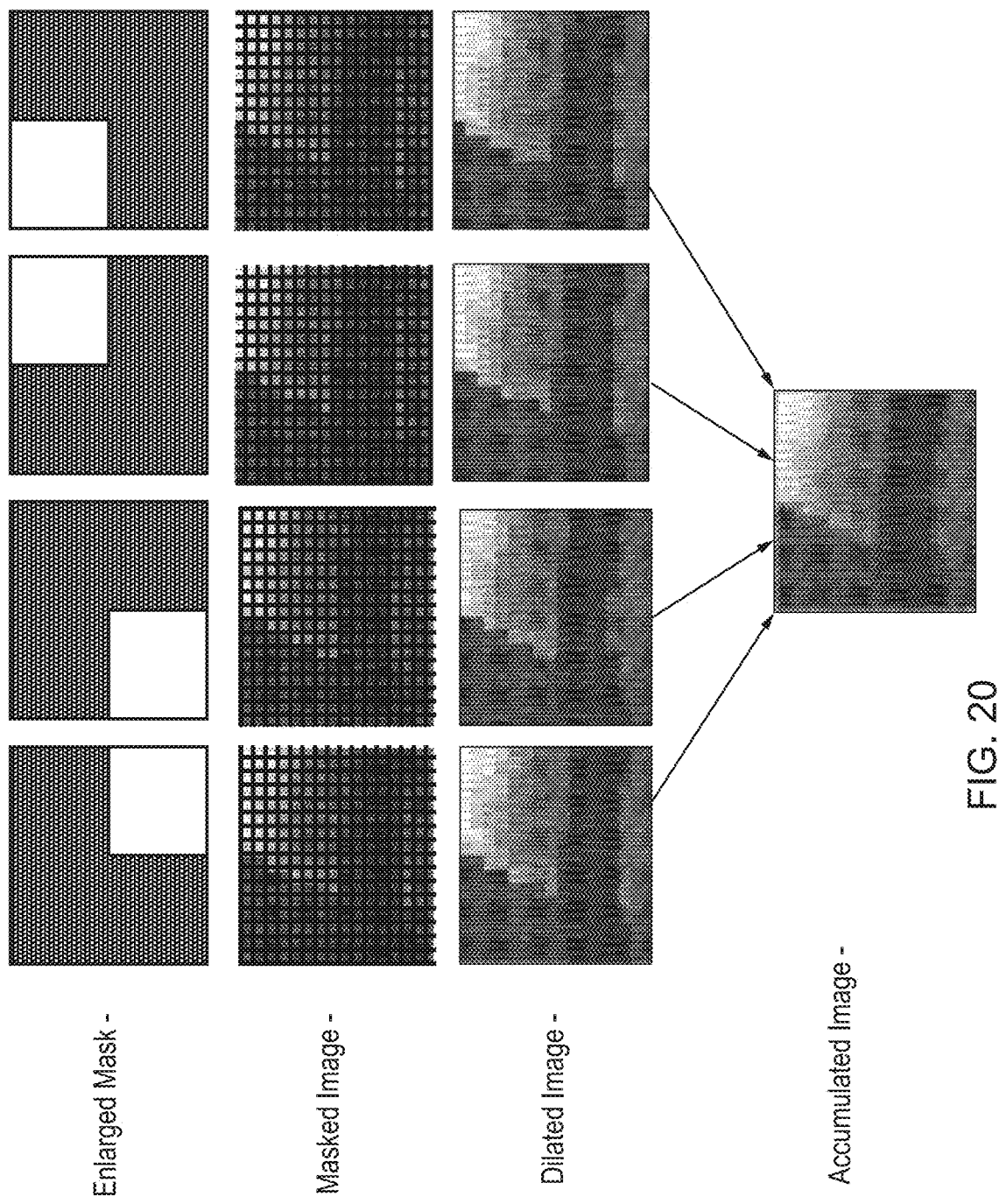

IMAGE PROCESSING VIA MULTI-SAMPLE ANTI-ALIASING

BACKGROUND

This disclosure relates to image processing, for example for image display.

As background, an example head-mountable display (HMD) will be discussed, although (as described further below) the disclosure is applicable to other types of displays.

An HMD is an image or video display device which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, the contents of which are incorporated herein by reference, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimetres from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

SUMMARY

Although the original development of HMDs was perhaps driven by the military and professional applications of these devices, HMDs are becoming more popular for use by casual users in, for example, computer game or domestic computing applications.

Certain deficiencies of the existing art are addressed through this disclosure and the embodiments herein.

BRIEF DESCRIPTION OF THE DRAWING

Embodiments of the disclosure will now be described with reference to the accompanying drawings, in which:

FIGS. 19A and B schematically illustrate a difference between pixel and sample resolutions for a modified multi-sample anti-aliasing scheme;

FIG. 20 schematically illustrates a process of generating output image based on a modified multi-sample anti-aliasing scheme;

DETAILED DESCRIPTION

Embodiments of the present disclosure can provide a display method and apparatus using a display operable to display an image to a viewer. In some embodiments, the display is a head-mountable display and the position and/or orientation of the viewer's head is detected by detecting a position and/or orientation of the head-mountable display. The head mountable display may have a frame to be mounted onto an viewer's head, the frame defining one or two eye display positions which, in use, are positioned in front of a respective eye of the viewer and a respective display element is mounted with respect to each of the eye display positions, the display element providing a virtual image of a video display of a video signal from a video signal source to that eye of the viewer. In other examples, the display is not a head-mountable display. In some embodiments, the display (whether head mountable or not) may be referred to as an immersive display, in that in normal use it fills at least a threshold angular range (for example, at least 40°) of the field of view of the user. Examples include multiple projector displays, wrap-around (curved) displays and the like.

Figure 1:
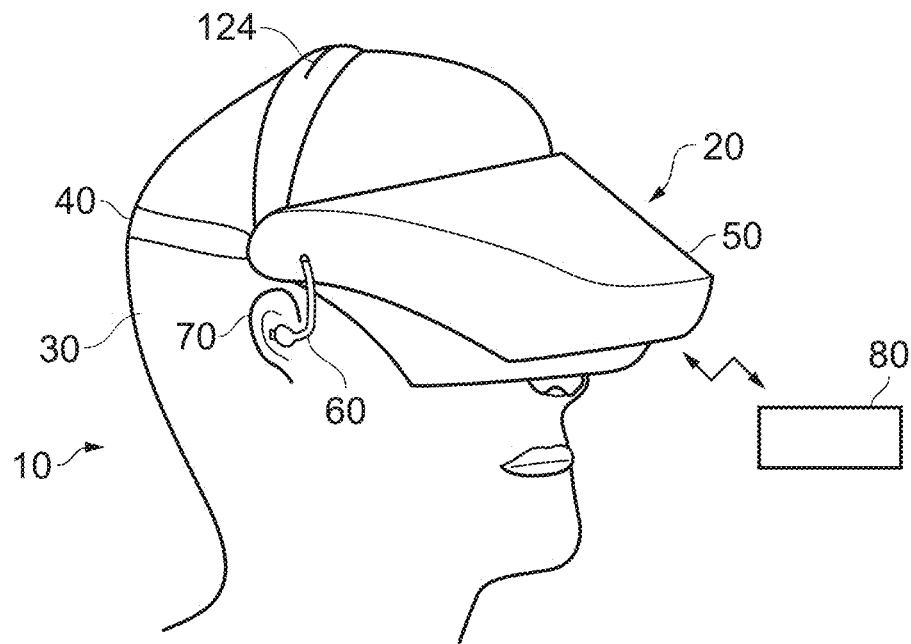
FIG. 1 schematically illustrates an HMD worn by a user.

Referring now to FIG. 1, a user 10 is wearing an HMD 20 on the user's head 30. The HMD comprises a frame 40, in this example formed of a rear strap and a top strap, and a display portion 50.

The HMD of FIG. 1 completely obscures the user's view of the surrounding environment. All that the user can see is the pair of images displayed within the HMD.

The HMD has associated headphone earpieces 60 which fit into the user's left and right ears 70. The earpieces 60 replay an audio signal provided from an external source, which may be the same as the video signal source which provides the video signal for display to the user's eyes.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
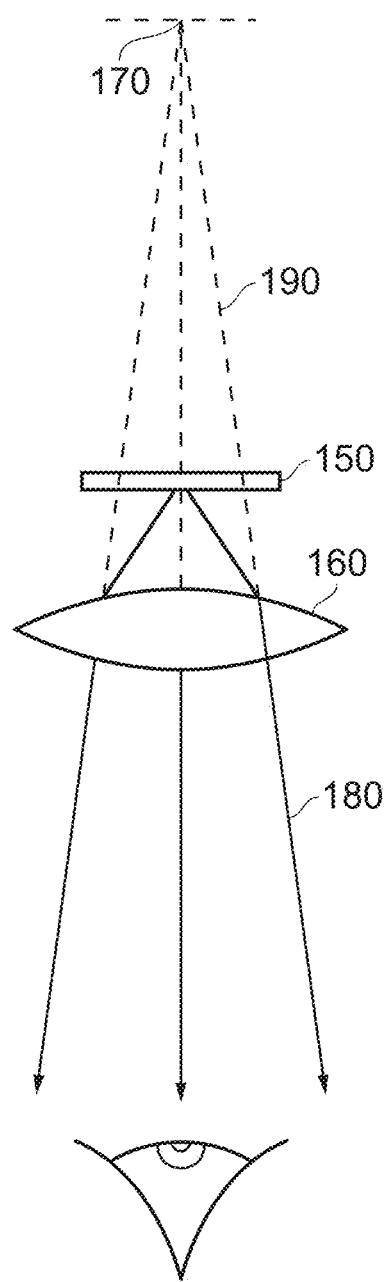
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
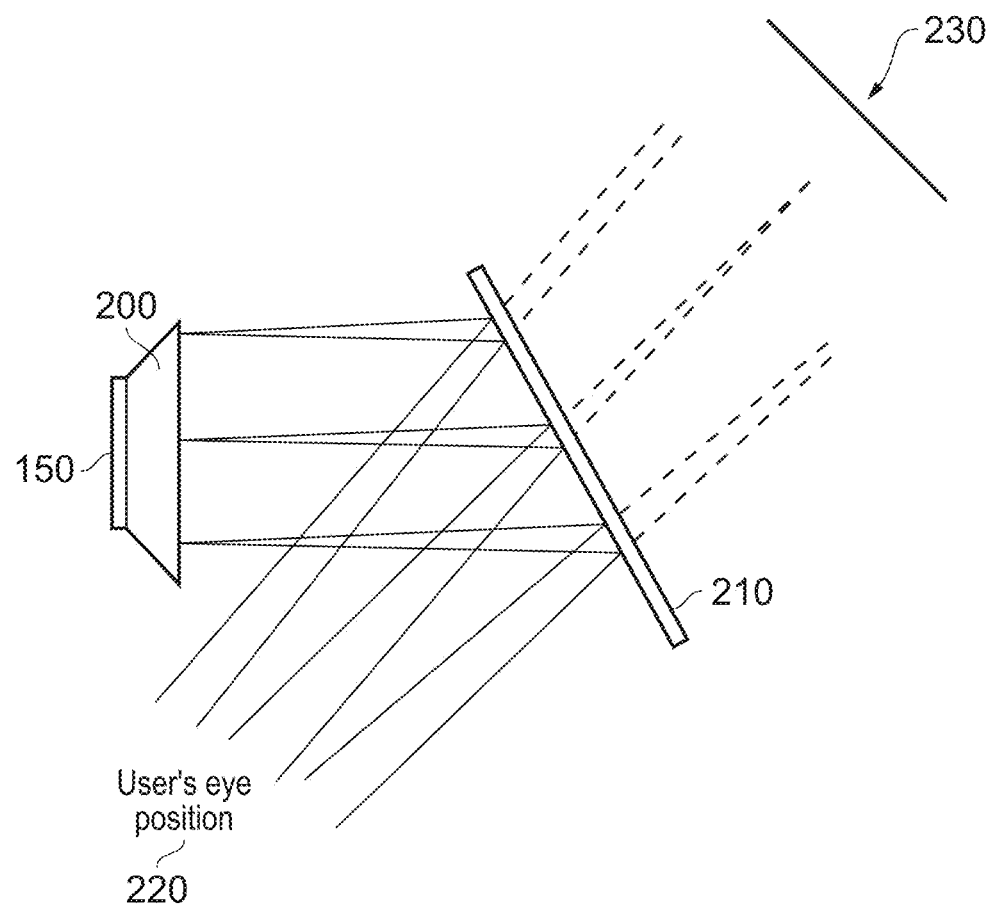
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint need to track movements with respect to a real or virtual space in which the user is located.

This tracking is carried out by detecting motion of the HMD and varying the apparent viewpoint of the displayed images so that the apparent viewpoint tracks the motion.

Figure 6:
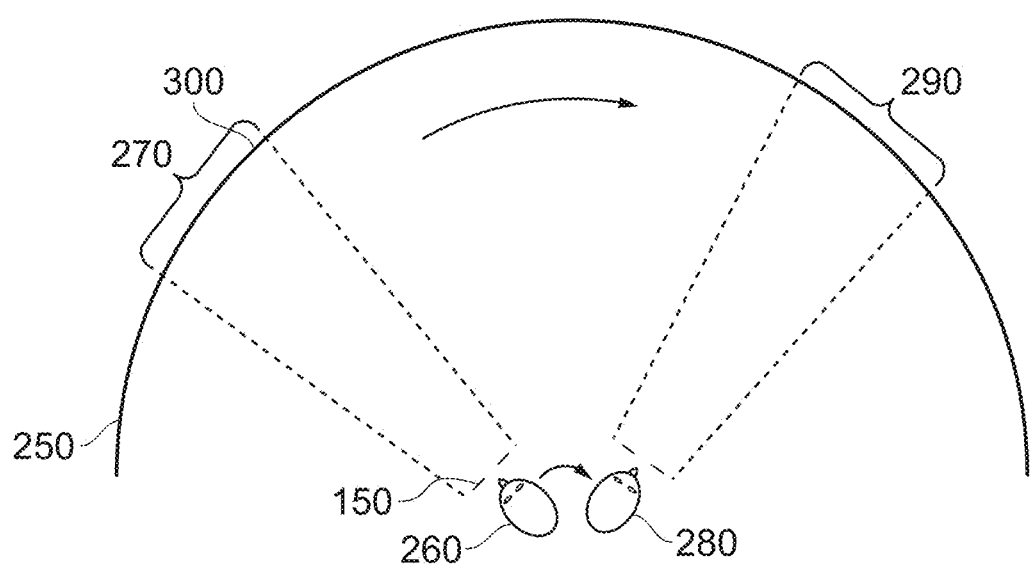
FIG. 6 schematically illustrates a change of view of user of an HMD.

FIG. 6 schematically illustrates the effect of a user head movement in a VR or AR system.

Referring to FIG. 6, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 6, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment. Similar considerations apply to the up-down component of any motion.

Figure 2:
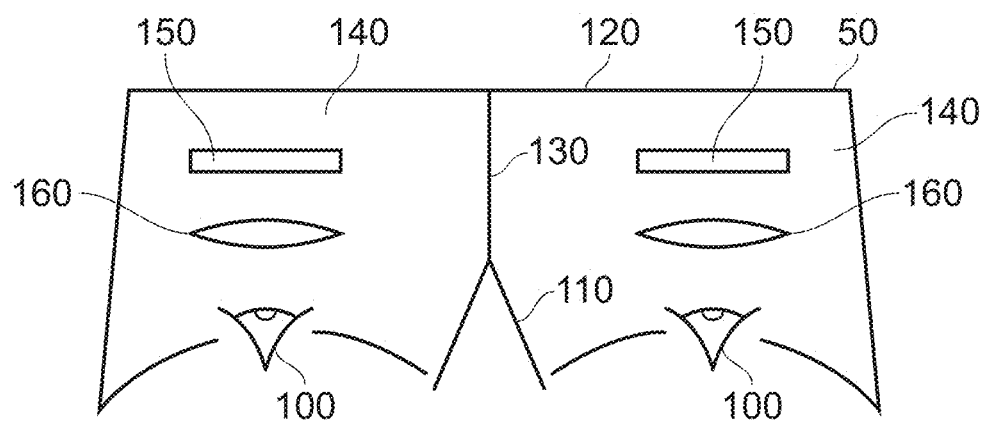
FIG. 2 is a schematic plan view of an HMD.
Figure 7A:
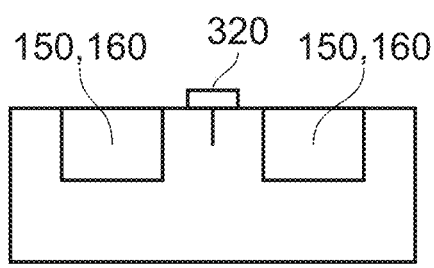
FIGS. 7a and 7b schematically illustrate HMDs with motion sensing.
Figure 7B:
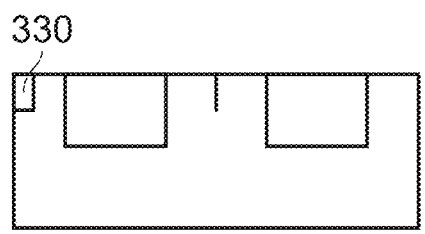

FIGS. 7a and 7b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 7a, a forward-facing camera 320 is provided on the front of the HMD. This does not necessarily provide images for display to the user (although it could do so in an augmented reality arrangement). Instead, its primary purpose in the present embodiments is to allow motion sensing. A technique for using images captured by the camera 320 for motion sensing will be described below in connection with FIG. 8. In these arrangements, the motion detector comprises a camera mounted so as to move with the frame; and an image comparator operable to compare successive images captured by the camera so as to detect inter-image motion.

FIG. 7b makes use of a hardware motion detector 330. This can be mounted anywhere within or on the HMD. Examples of suitable hardware motion detectors are piezo-electric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 8:
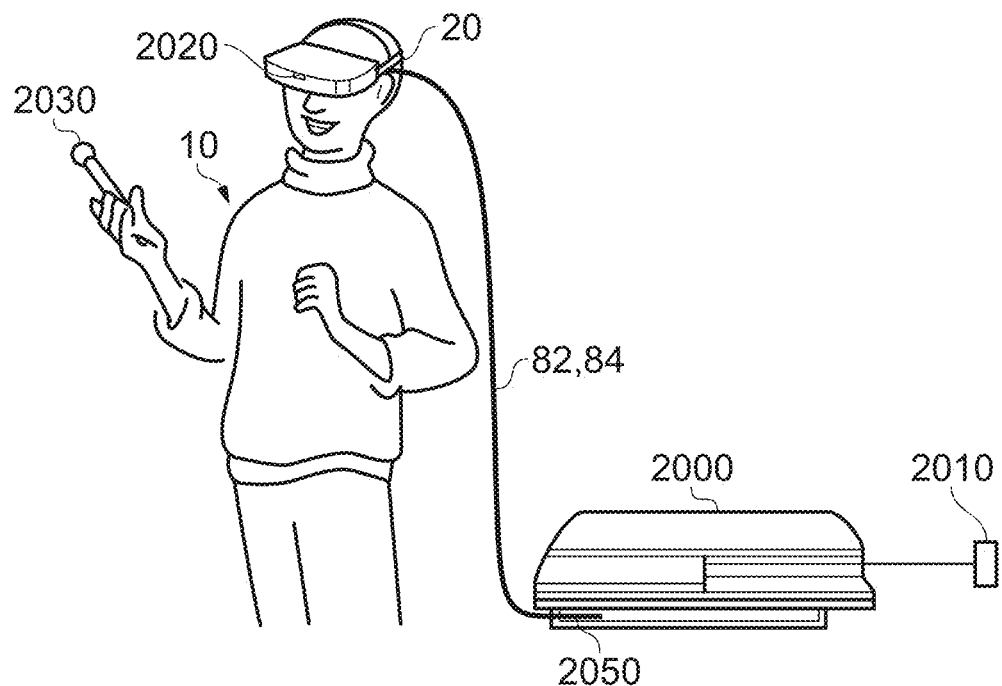
FIGS. 8 and 9 schematically illustrate a user wearing an HMD connected to a Sony® PlayStation 3® games console.

FIG. 8 schematically illustrates a user wearing an HMD connected to a Sony® PlayStation 3® games console 2000 as an example of a base device (corresponding to the external video source 80 of FIG. 1), a further example of a base device is a PlayStation 4® games console. The games console 2000 is connected to a mains power supply 2010 and (optionally) to a main display screen (not shown). A cable, acting as the cables 82, 84 discussed above (and so acting as both power supply and signal cables), links the HMD 20 to the games console 2000 and is, for example, plugged into a USB socket 2020 on the console 2000. Note that in the present embodiments, a single physical cable is provided which fulfils the functions of the cables 82, 84. In FIG. 8, the user is also shown holding a hand-held controller 2030 which may be, for example, a Sony® Move® controller which communicates wirelessly with the games console 2000 to control (or to contribute to the control of) game operations relating to a currently executed game program.

The video displays in the HMD 20 are arranged to display images generated by the games console 2000, and the earpieces 60 in the HMD 20 are arranged to reproduce audio signals generated by the games console 2000. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 2050 mounted on the HMD 20 are passed back to the games console 2000 via the cable 82, 84. Similarly, if motion or other sensors are provided at the HMD 20, signals from those sensors may be at least partially processed at the HMD 20 and/or may be at least partially processed at the games console 2000.

The USB connection from the games console 2000 also provides power to the HMD 20, according to the USB standard.

Figure 9:
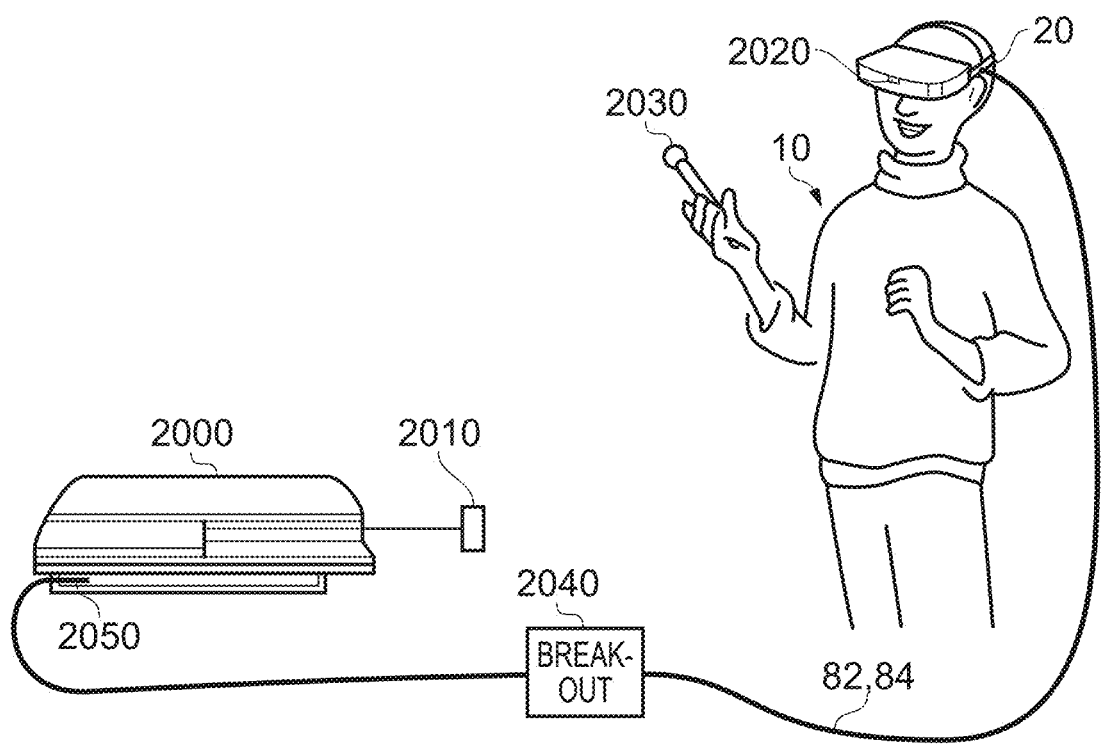

FIG. 9 schematically illustrates a similar arrangement in which the games console is connected (by a wired or wireless link) to a so-called "break out box" acting as a base or intermediate device 2040, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 2040 is fixed to the ground or to a piece of furniture, but rather than having a very long trailing cable from the games console 2000, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

Figure 10:
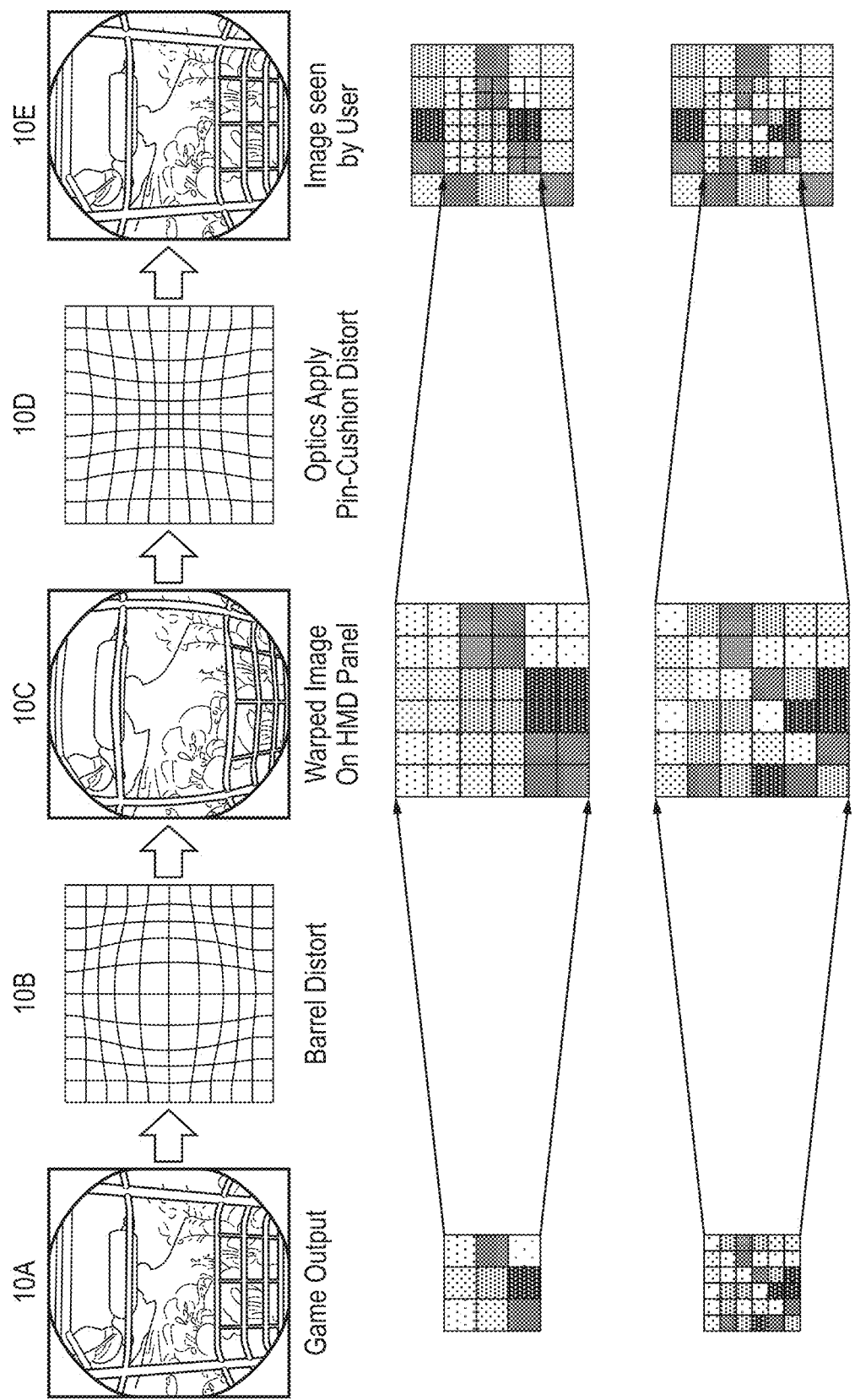
FIGS. 10A-E schematically illustrate a sequence of distortions are applied to a game output image between its original output and perception by the user.

Referring now to FIG. 10, it will be appreciated that the process of generating stereoscopic imagery (i.e. two images) at high frame rates is computationally expensive. Accordingly, it is desirable to reduce computational overhead where possible, and preferably in a way that does not significantly impact on the user's perceived experience of the game.

One way to reduce computational overhead is to reduce the number of pixels that need to be rendered in an image.

In the case of the HMD, it will be appreciated that the image projected onto the user's eyes by the HMD optics is effectively circular; the optics are arranged to project substantially the maximum width and height of the display panels onto the user's (circular) pupils, so that the content of the panel occupies all of the user's vision. However, this means that the corners of the (square) image do not fall within the user's field-of-view.

Accordingly, for each displayed image, as an initial step when generating rendered game output 10A, a circular rendering mask can be applied that prevents the rendering of pixels in the corners of the image that are not visible to the user. This removes approximately 25% of the pixels that could be rendered in the original image.

However, there is scope to further improve the computational efficiency of the rendering process.

The HMD optics also apply a so-called pincushion distortion 10D to the image displayed on the left and right display panels of the HMD. Clearly this would result in an undesirable effect if applied to the game output 10A. Therefore in order to compensate for this, an inverse distortion known as a barrel distortion 10B is applied to the output game image, resulting in a warped image 10C being displayed on the respective panel of the HMD.

This barrel distortion can be implemented either by a relative shrinking of peripheral sections of the image, or equally by a relative expansion of central sections of the image. In either case, the degree of change applied is typically a continuous function of the distance from the centre of the image. The specific function is typically computed or empirically determined to be an inverse of the degree of change across an image caused by the HMD optics, thereby compensating for the optical effect.

FIG. 10 also illustrates, on the second row, exemplary pixels notionally taken from the centre of the respective images 10A, 10C and 10E. It can be seen that where barrel distortion is implemented by relative magnification of the centre of the image, the original pixels of the game output are magnified so that potentially one image pixel is displayed across plural physical pixels on the HMD panel, before being shrunk back down to approximately their original size through the pincushion distortion of the optics when perceived by the user. Clearly however, this is an inefficient use of the physical pixels on the HMD panel.

Consequently as is illustrated in FIG. 10 at the third row, optionally the game output is generated at a higher resolution than the native pixel resolution of the HMD panel (for example, at 1.4× resolution, where the increase in resolution is typically chosen to roughly correspond to the degree of magnification caused by the barrel distortion at the centre of the image). Accordingly, when the image is barrel distorted, pixels at the centre of the image substantially correspond with the physical pixels of the HMD panel, and hence are displayed more crisply and accurately. Furthermore when these pixels are shrunk back down through the pincushion distortion of the optics, the user perceives the central region of the image to have the higher resolution.

However, it will be appreciated that whilst barrel distorted pixels in the central region of the image may achieve an approximately 1:1 mapping with physical pixels on an HMD display panel, barrel distorted pixels in the peripheral regions of the game output image, having a higher resolution than the physical resolution of the panel, are sub-sampled (i.e. there is more than one image pixel for each physical pixel) and hence image information and corresponding computational effort in generating that image information is wasted.

In principle the most efficient solution to this problem would be to render the game output image at different resolutions corresponding to the degree of magnification from the barrel distortion as a function of radial distance from the centre; however, existing graphics hardware cannot do this.

An alternative solution therefore is to render the full image at a low resolution, and render the central region of the image at a higher resolution, thereby saving some computational overhead. However, this solution is not ideal for a number of reasons; firstly there are computational administrative overheads with having more than one render target (the low and high resolution images), secondly it is necessary for the renders to overlap to a certain extent so as to allow smooth blending of the two portions—which is innately inefficient, and thirdly it is only a crude approximation of the continuous variation in magnification provided by the barrel distortion, and hence may result in a noticeable variation in image quality within the final perceived image.

Figure 11:
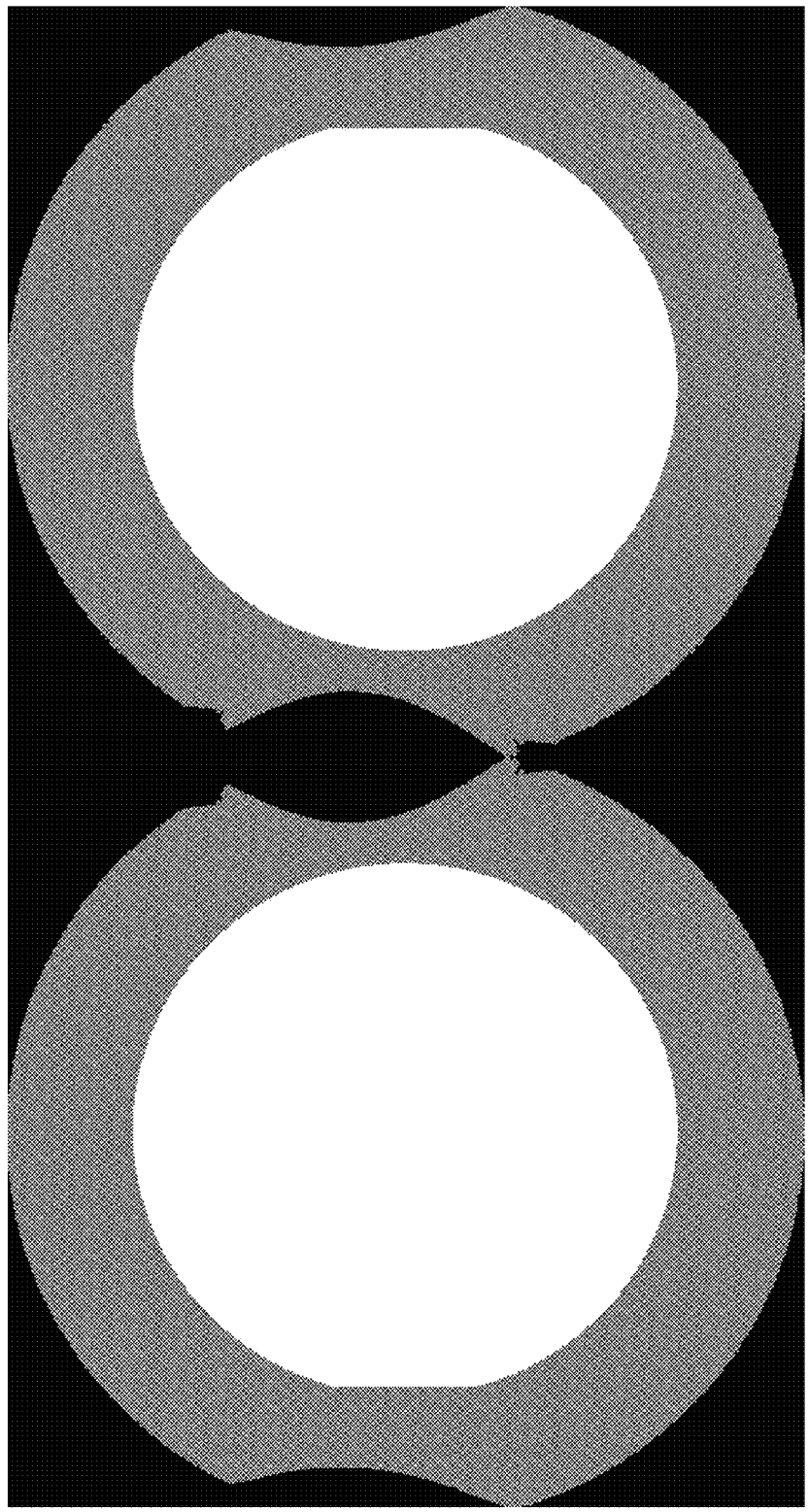
FIG. 11 schematically illustrates a mask for use in efficiently generating a game output image.

Accordingly, and referring now also to FIG. 11, in an embodiment of the present invention, additional render masking is applied during generation of the game output image to further reduce the number of pixels initially rendered.

FIG. 11 is a rendering mask (showing both left and right images side-by-side for the purposes of explanation). As was explained previously herein, black pixels of the rendering mask represent pixels that will be masked out by means of stencilling or depth testing and hence serve to prevent rendering of the corresponding image pixel. The solid black outer border of this image corresponds to those pixels outside the users substantially circular field of view discussed previously. Furthermore, FIG. 11 illustrates that at the periphery of the image that is seen by the user, a dithering pattern is now used on the rendering mask (in this figure, alternating on/off mask pixels in a chequerboard pattern) to reduce the number of pixels that are rendered.

It will be appreciated that FIG. 11 illustrates the simplest embodiment, in that there is only one dithering stage between full rendering and no rendering in the mask. However, the above technique is not limited to this. Hence for example, referring to FIGS. 12A and 12B (a magnified portion of 12A provided for clarity), progressive dither patterns can be applied as a function of radius from the centre of the image. Hence in FIGS. 12A and 12B, near the centre of the image there is no dither. Then a 25% dither is applied, followed by 50% dither, followed by a 75% dither, before the 100% mask is applied at the effective edge of the image.

Figure 13:
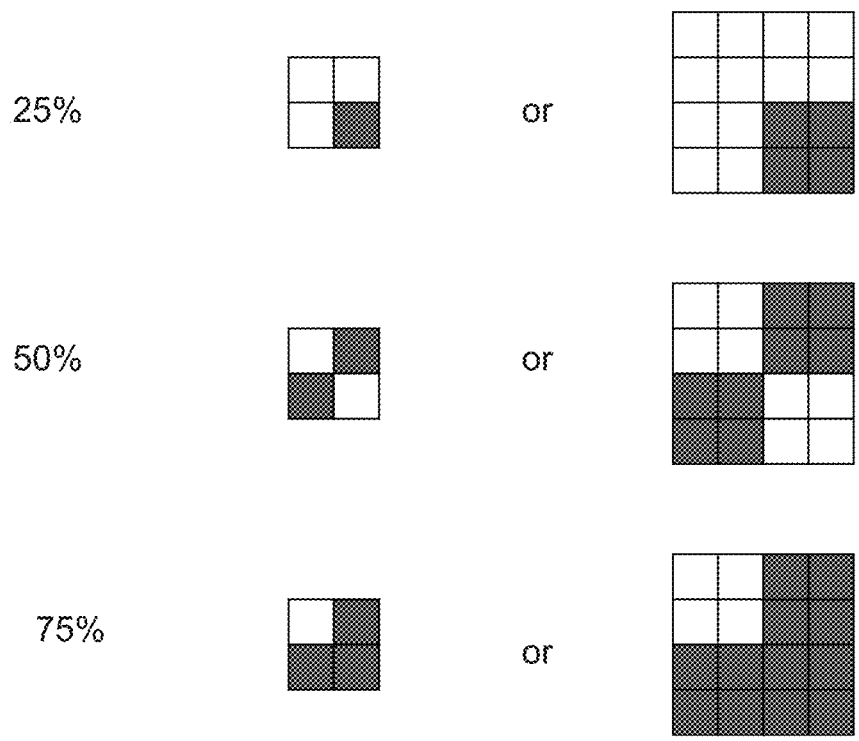
FIG. 13 schematically illustrates mask patterns for use in a mask.
Figure 14:
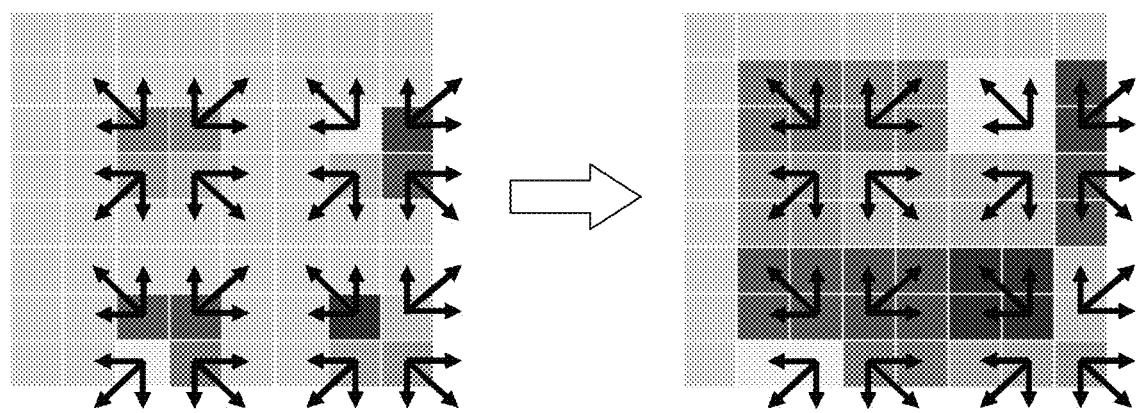
FIG. 14 schematically illustrates a pixel dilation process.

FIG. 13 illustrates typical dither patterns for 25%, 50% and 75% dither. Referring now to FIG. 14, once the image has been rendered in this manner, with (increasingly) sparsely rendered pixels within the dithered regions, a low-cost dilation pass is applied to the image so that colour information from one or optionally more rendered pixels is copied to a neighbouring masked pixel, thereby filling in the gaps in the image created by the render mask. Dilation can be applied after rendering is complete, as a separate pass. Alternatively, rather than having a separate pass to dilate nearby pixels into the masked pixels, embodiments of the present invention can save bandwidth by performing these reads on demand. This requires more shader ALU cycles, which is largely hidden by other latency in the shader, to save bandwidth reading and writing textures. In addition because the sampling is from the masked version it actually samples fewer pixels in total, which is more efficient as the access patterns are more cache-friendly.

FIG. 14 shows the result of dilation in a 75% dither region, resulting in colour blocks four times the original rendered pixel size.

Hence the result of this dither masking process is that a 25% dither pattern results in an effective three-quarter resolution image region, a 50% dither pattern results in an effective half resolution image region, and a 75% dither pattern results in an effective one quarter resolution image region.

In this way, it is possible to better approximate the desired radial variation in resolution discussed previously herein, and also obtain the beneficial reduction in computational load that would come with such variable resolution rendering, caused by substituting the computational load of rendering the now-masked pixels in the periphery of the image with the much lower computational load of dilation (copying) from other rendered pixels. For the image shown in FIG. 12A, the computational cost saving is in the order of 20%, in addition to the 25% obtained by masking out the corners of the image as discussed previously.

Furthermore, it will be appreciated that whilst the above examples show three levels of dither (four if you also count no dither as a 0% dither pattern), a more continuous approximation of the effect of changing resolution due to barrel distortion of the image could be envisaged by using an expression describing the barrel distortion as a function of radius, to determine the probability of masking a given pixel as a function of radius from the centre of the image; thereby generating a statistically smooth mask distribution as a function of radius, progressing from typically no masking at the centre of the image (or a central region of the image) through to N % masking at the outer periphery, where N may for example be 50%, 75%, 90% or 100%. Clearly also rules could be provided, if desired, to override the creation of mask regions of a size larger than a certain number of pixels due to random chance, further optionally with such sizes also defined as a function of radius. Optionally, this mask need only be created once. This mask would represent a statistically accurate representation of the gradually changing resolution of the image corresponding to barrel distortion magnification as a function of radius over the image.

Figure 12A:
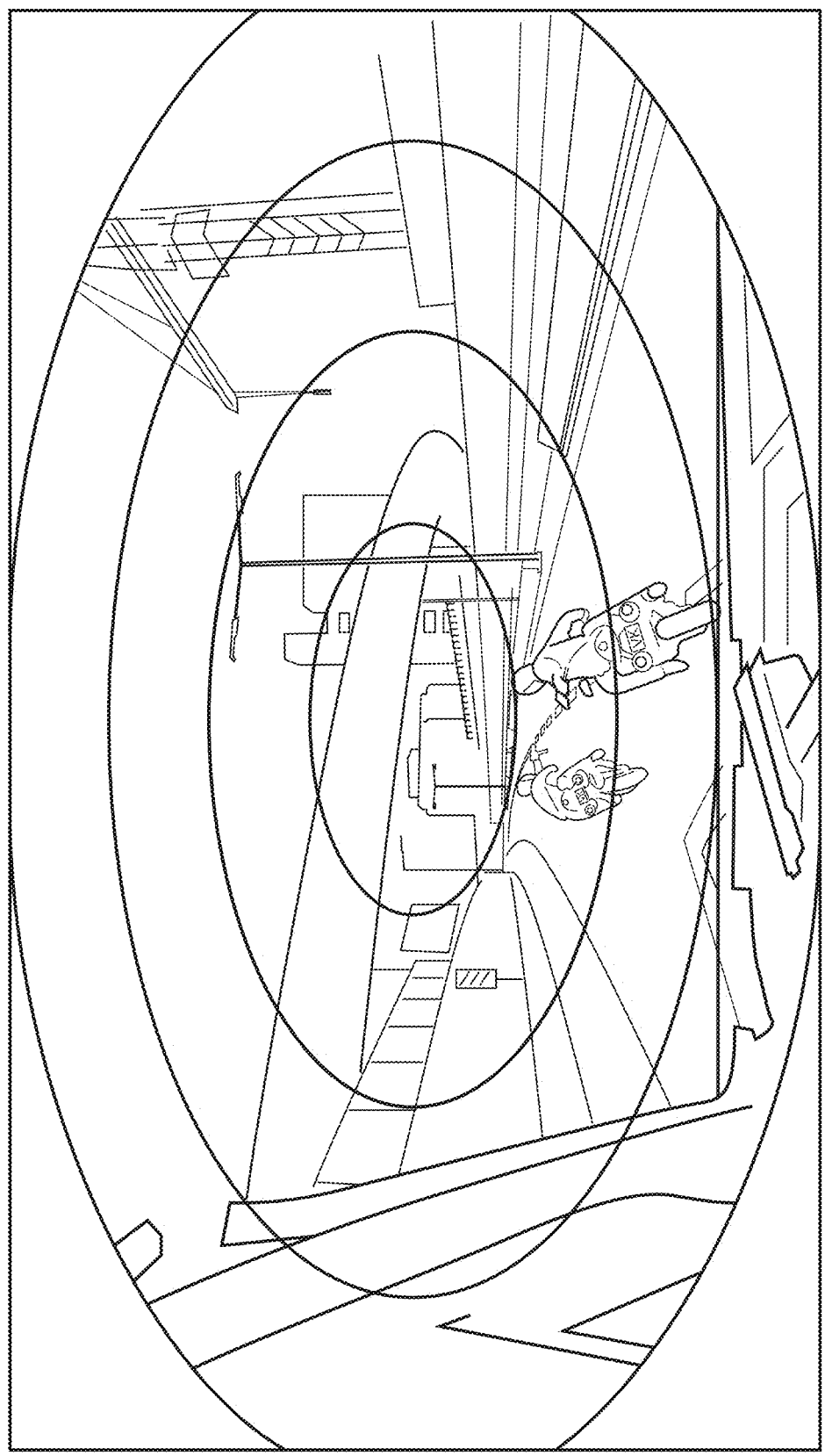
FIGS. 12A and 12B schematically illustrate a mask for use in efficiently generating a game output image.
Figure 12B:
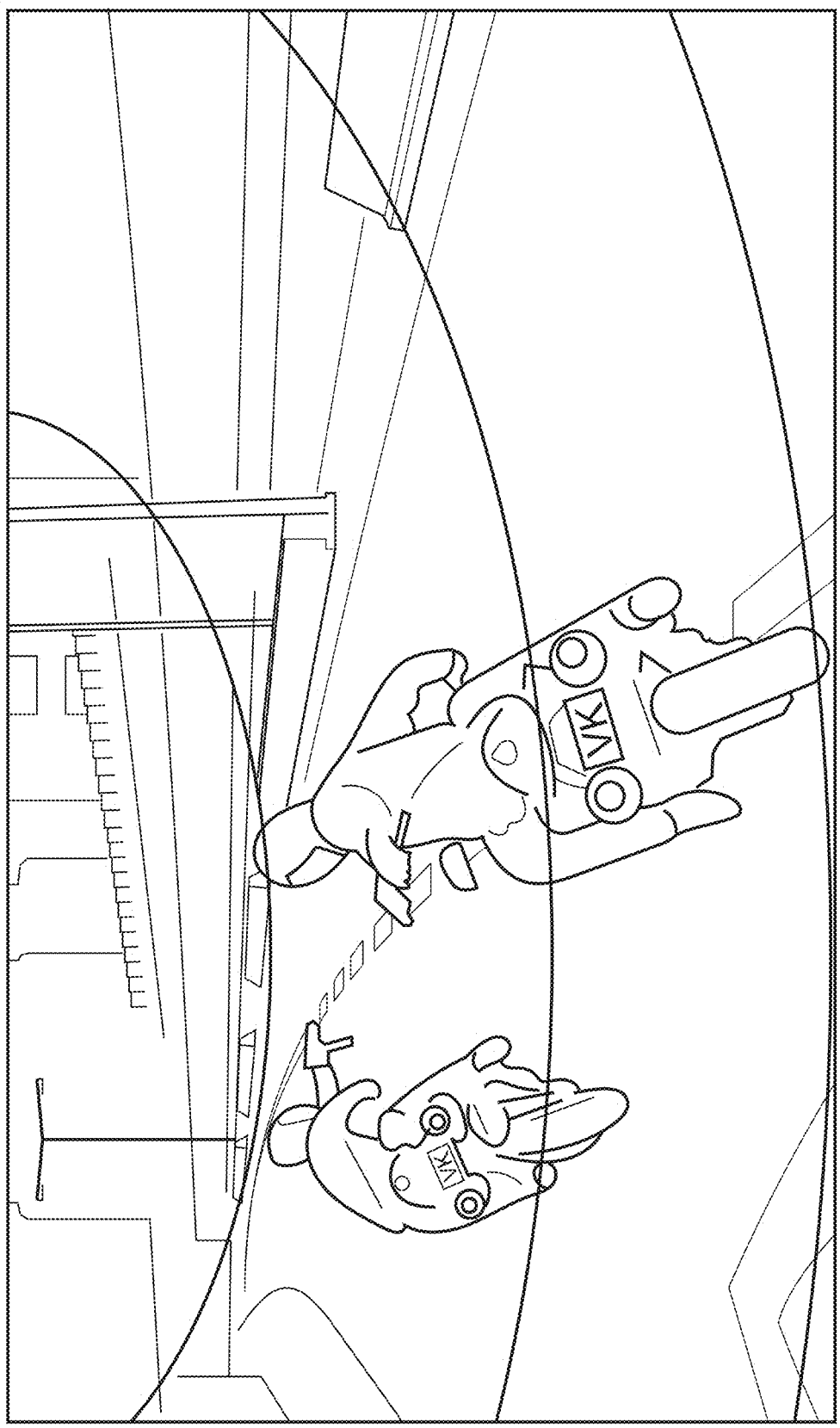

The above techniques achieve the desired effect of approximating a variable resolution render of the game output by use of a render mask (to a first level of approximation in FIG. 11, to a second level approximation in FIG. 12A, and to a third level of approximation in the above described probabilistic model).

Advantageously therefore the hardware has a lower computational overhead in creating the game output image for a negligible or less obtrusive impact on image quality compared for example to the alternative solution of rendering high and low resolution images and stitching them together, as discussed previously.

Consequently, the hardware can either produce more complex graphics for the same frame rate, or an increased frame rate for the same level of complexity in the graphics— which for virtual reality is important, as any lag between head movement and rendered image is a significant factor in a user's sense of immersion and comfort.

However, due to the patterned sampling of the rendered image caused by the dither patterns, and also effective magnification of these samples through dilation, this can result in undesirable aliasing and blocking effects in the final image, albeit in peripheral regions of the image where the user may not notice them.

Figure 15A:
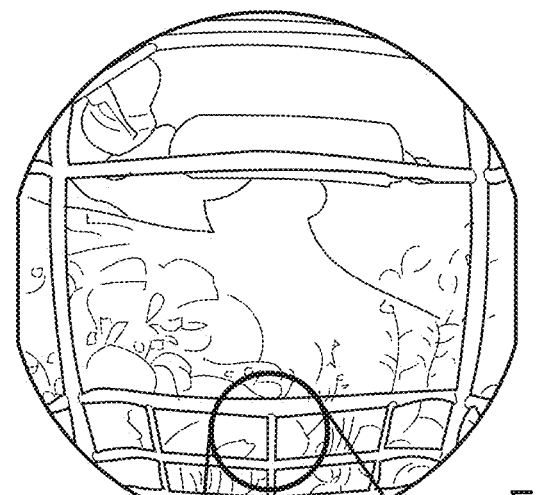
FIGS. 15A and B illustrate artefacts in a processed image.
Figure 15B:
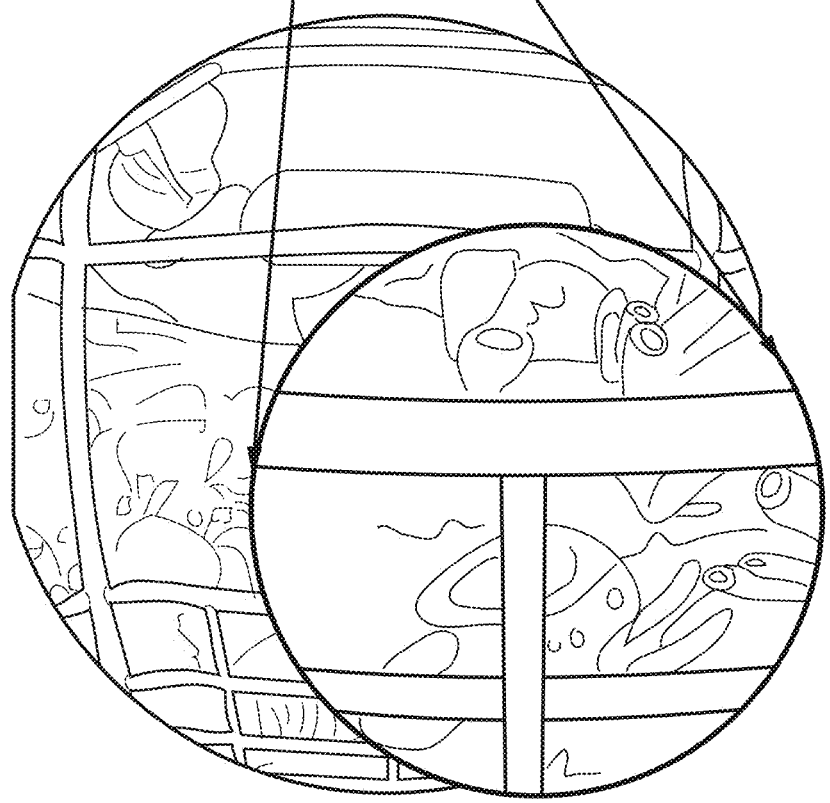

FIG. 15A shows an example image without dither and dilation, and FIG. 15B shows a blown-up region of the same image after dither and dilation have been applied in accordance with the dither scheme shown in FIG. 12A. Aliasing and blocking patterns can be clearly seen in the blown-up section of the image.

It would be desirable to avoid this effect, whilst retaining the computational efficiency of the technique.

Accordingly, in an embodiment of the present invention, this principle is adapted so that over a sequence of 4 frames, a sample for a given pixel is taken per frame whilst the dither masks change per frame, so that different pixels contribute to the multiple sample. In this way the low-resolution 'dilated pixels' seen in FIG. 14 are assigned a colour that is a blend of the underlying individual pixels rendered in the last 4 frames that contributed to a respective dilated pixel.

Figure 16:
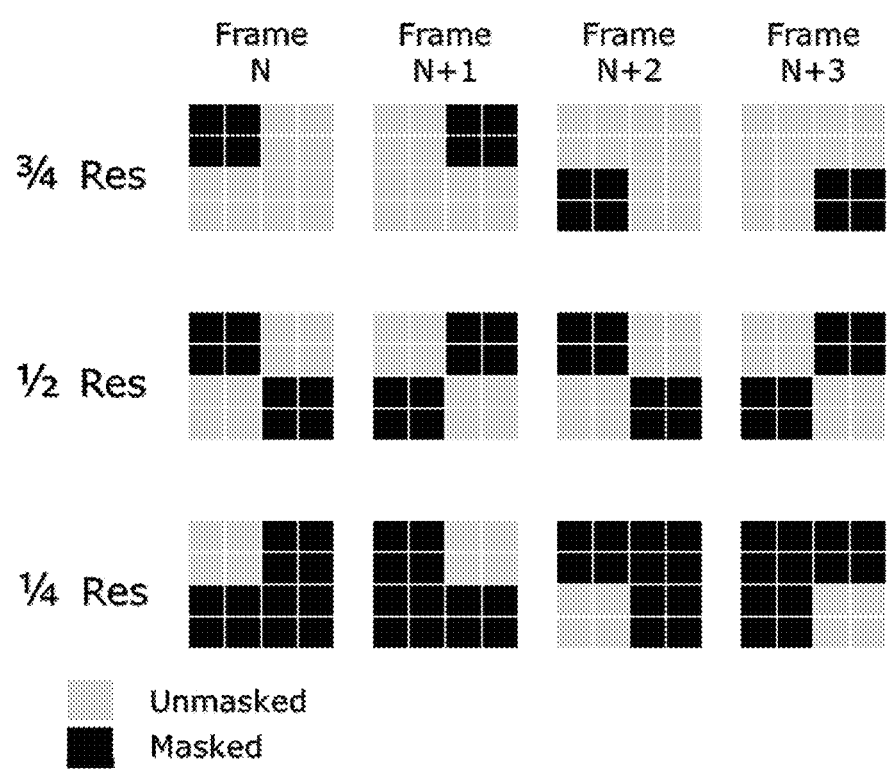
FIG. 16 schematically illustrates sequential changes to respective mask patterns.

FIG. 16 illustrates this process for a four frame sequence, in which different rotated versions of the 25%, 50% and 75% dither patterns are successively used.

It will be appreciated that where a probabilistic distribution of mask pixels responsive to the function of the barrel distortion has been used, as described previously herein, then there is no predetermined dither pattern to rotate. However equivalent masks can be readily generated by rotating each 2×2 or 4×4 block of the overall mask through 180° (in the case of a two frame sequence), or successively through 90° (in the case of a four frame sequence) to achieve the same effect.

This process therefore trades some temporal resolution for spatial resolution. It will be appreciated that the approach may be implemented only in the areas of the image that have a dithered mask, or only in areas of the image that have an N % threshold dither (for example, 50% dither and more, or only the 75% dither), with a conventional antialiasing technique being applied elsewhere in the image, if desired, so that a loss of temporal resolution is not caused in areas of the image that do not experience image artefacts due for example to 1:4 dilation (¼ resolution, 75% dither) regions.

This acknowledges that the largest effect on the quality of the image is where the largest amount of the source image is masked out.

Figure 17:
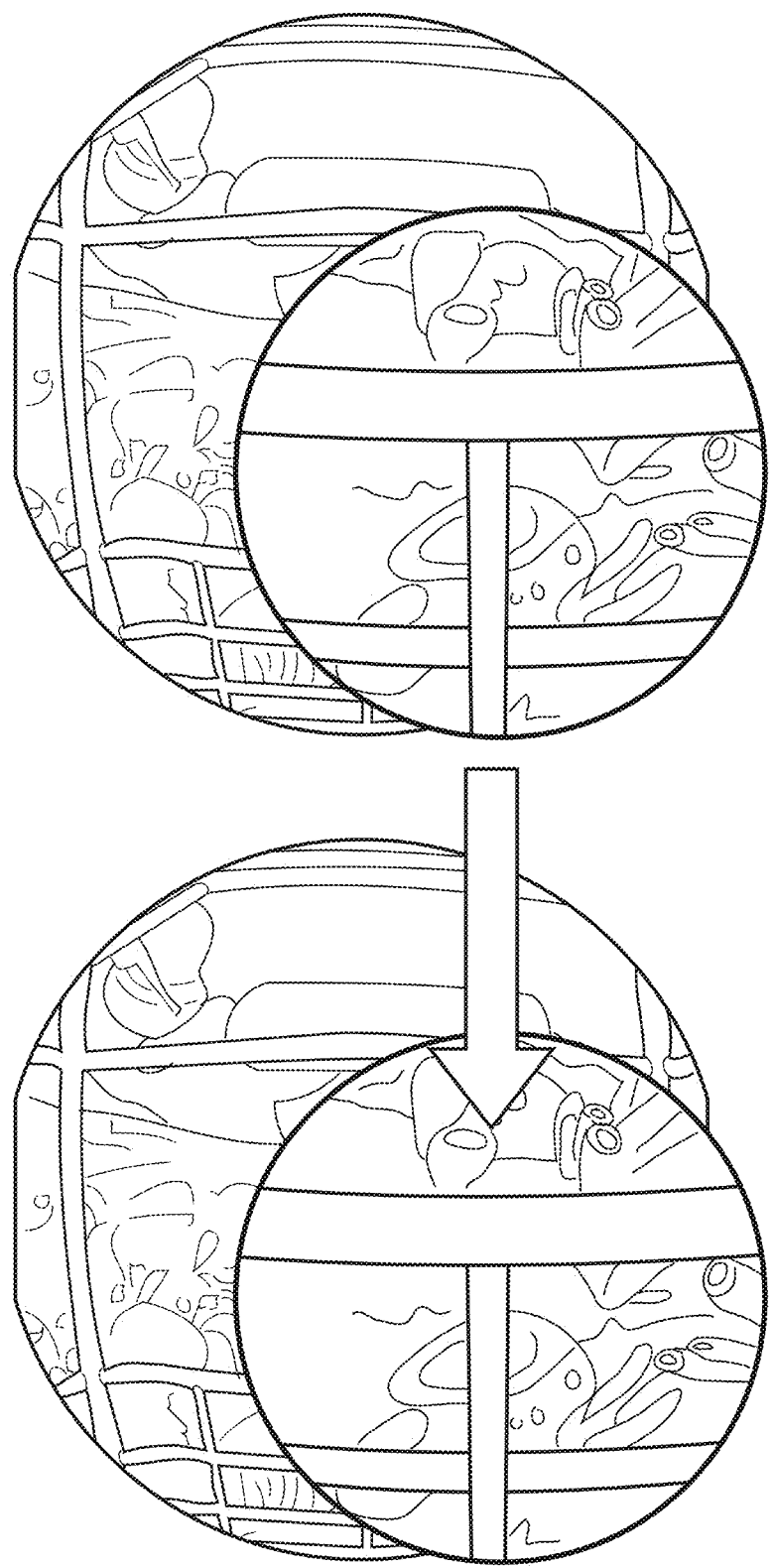
FIG. 17 illustrates a reduction of artefacts in a processed image.

FIG. 17 illustrates the difference in image quality caused by applying the above time-sampled anti-aliasing approach to dilated pixels of the image. It can be seen that the stepping and aliasing artefacts have been greatly reduced and in most cases eliminated.

In embodiments of the present invention, it would not be as efficient for per-pixel stencil masks to be used, because GPUs shade in blocks of 2×2 pixels called "quads"; if any pixels within a quad require shading then any masked pixels within that quad will be shaded anyway and discarded, thus eliminating any performance gain from masking the pixels. Hence referring back to FIG. 13, the render mask would therefore resemble the 4×4 patterns in the right-hand column.

However, it is desirable to have effective per-pixel control of the mask.

A property of MSAA can be used to achieve this.

Figure 18:
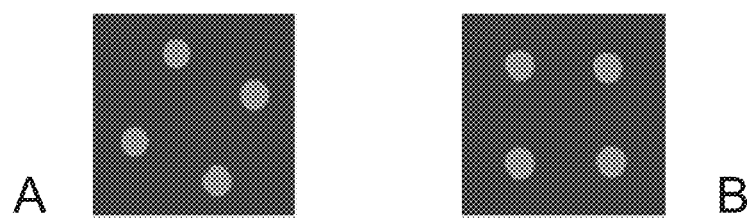
FIGS. 18A and B schematically illustrate a difference between conventional multi-sample anti-aliasing sample points and modified multi-sample anti-aliasing sample points.

Embodiments of the present invention shade using 4×MSAA but instead of shading at "pixel rate" as per normal MSAA usage for antialiasing, shading is at "sample rate" instead. This means that the pixel shader is invoked for all 4 samples sampled within each pixel, rather than just running once. So if one uses 4×MSAA and render at this sample rate, and reduce the resolution to half in each axis, then one has the same number of pixels in the image. This is illustrated schematically by the transition from FIG. 19A to 19B. If one additionally adjusts the MSAA sample locations into an unrotated grid pattern, rather than the default rotated grid (see FIGS. 18A—rotated and 18B—unrotated), then after the MSAA resolve one has an almost identical image to one without the MSAA adaptation (ignoring rounding differences during rasterisation). Owing to the fact that hardware requires its quads, as described above, to be made up of samples in an image-aligned grid pattern, when MSAA is enabled the samples that make up the pixel quad are no longer a contiguous 2×2 grid. Instead, a quad is made up of the corresponding sample from each pixel in a 2×2 grid of pixels. Hence a quad might be made up of sample 0 from each of the 2×2 grid of pixels, and the next quad would be made up of sample 1 from each of the 2×2 grid of pixels, etc.

This property means that masking a whole quad now happens to generate a pixel granularity masking pattern (in fact "sample granularity" but because the shading is at the sample frequency this means a sample is ultimately a pixel in this case).

Then in a similar manner to that described previously, the masking pattern rotates in successive frames, so that the adapted MSAA sampling process is used to generate a different pixel from four samples for each unmasked region in the masking pattern.

Hence for each frame the MSAA process renders a sparse distribution of pixels according to the masking pattern used in that part of the image, with the position of the pixels changing with each frame.

Then for each frame, the above-described dilation process is used to fill in the one, two or three missing pixels as applicable, depending on the dither pattern used in a region of the image.

Then, a separate and standard temporal anti-aliasing technique (potentially as simple as a rolling average) may be used to blend the dithered images over 2, 3, 4 or more frames.

This process is summarised in FIG. 20. The first row of this figure shows the enlarged mask obtained by treating the MSAA target as if it was full resolution, for the case of the ¼ resolution dither mask. The second row shows the resulting sparse pixel distribution, with different pixels being generated as the masking pattern changes with each frame. It is not without irony that the process of generating a PDF for the purposes of filing a patent application has anti-aliased the illustrated sparse pixels in this figure. However in practice such anti-aliasing does not occur at this stage. The third row then shows the image after these sparse pixels have been dilated to fill in the gaps. Finally the fourth row shows the image output by the subsequent temporal anti-aliasing, combining the contributions from (in this case) four frames.

As described previously herein, by changing the dither pattern as a function of distance from the centre of the image to decrease the number of rendered pixels, the effective resolution of the image can thus be varied to approximate the effective variation in resolution created by the barrel distortion subsequently applied to the output image.

Hence advantageously the system can efficiently render an image with a varying effective resolution across the image.

Furthermore whilst the above description refers to a dither pattern that reduces the effective resolution as a function of distance from the centre of the image in order to compensate for barrel distortion, it will be appreciated that in principle an arbitrary dither pattern may be used where this can reduce computational overhead for rendering at little cost in visual quality. Hence for example a dither pattern could be applied to regions of an image corresponding to sky or clouds, or to any texture in a scene that has less than a threshold amount of spatial variation (which may be determined in advance or during an initialisation phase for example as a sum of the modulus of the change in pixel values across the texture, or based on the values of non-DC peaks in a 2-D Fourier transform of the texture). Such textures could be flagged as suitable for the above technique in advance.

Conversely, where for example an object of significance is located towards the periphery of the image, it may be desirable to override the dither pattern and render that object at a higher effective resolution so that the best possible version of the image is output. An example of this scenario may be where there are two characters on screen; when the user looks to focus on the first character, the second character may be located towards the periphery of their vision but may still have a significant role within an ongoing dialogue. Consequently it will be preferable for the second character (or, for example, at least their face) to still be rendered at full resolution.

Hence in a variant embodiment of the present invention, predetermined game elements having a threshold level of importance associated with them (such as character faces) are not subject to a dither mask, or are subject to a reduced and/or maximum percentage dither mask. For example, they may be subject to a 25% lower dither mask or a 50% lower dither mask than the surrounding region.

Hence compared to any default dither pattern in the image, high importance features of the image may have no dither or a reduced dither and hence a comparatively higher effective resolution, whilst low importance and/or low spatial frequency features of the image may have a dither or increased dither and hence a comparatively lower effective resolution.

Figure 21:
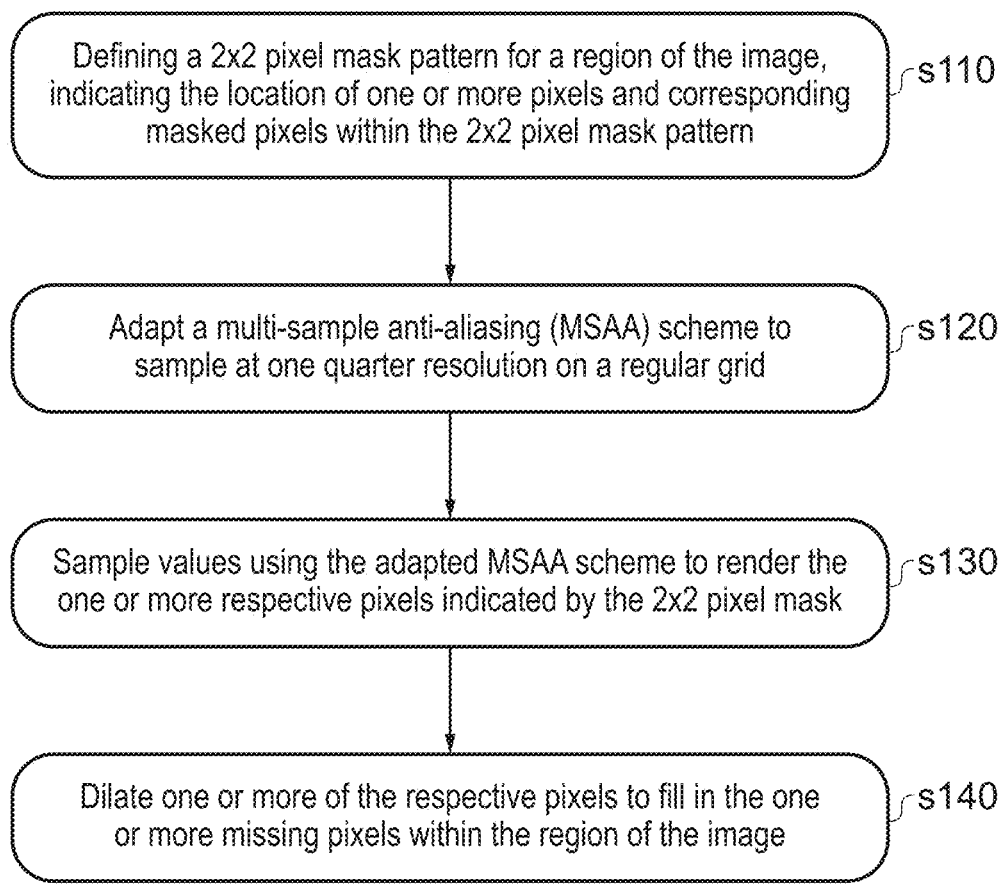
FIG. 21 is a flow diagram of an image processing method for an image generated for display by a head mountable display device.
Figure 22:
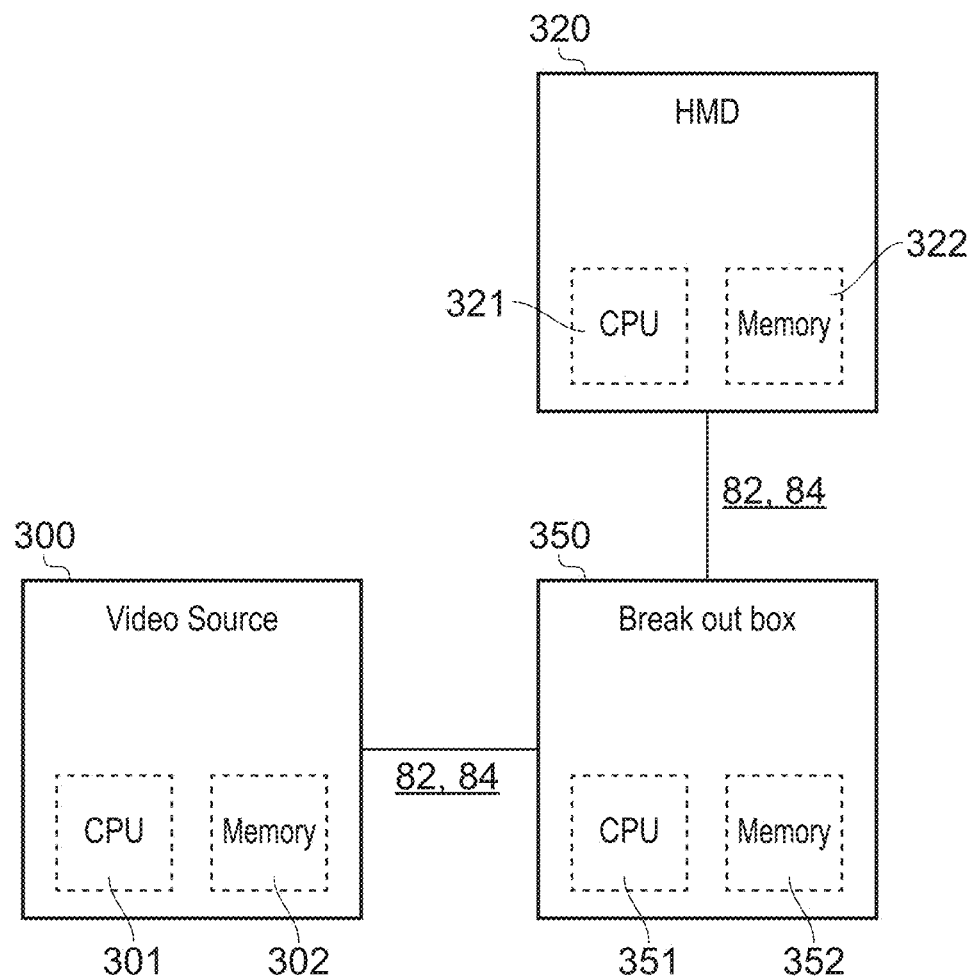
FIG. 22 is a schematic diagram of a hardware arrangement.

Referring now to FIG. 21, in a summary embodiment of the present invention an image processing method for an image generated for display by a head mountable display device comprises:

in a first step s110, defining a 2×2 pixel mask pattern for a region of the image, indicating the location of one or more pixels and corresponding masked pixels within the 2×2 pixel mask pattern, as described previously herein;

in a second step s120, adapting a multi-sample anti-aliasing (MSAA) scheme to sample at one quarter resolution on a regular unrotated grid, as described previously herein;

in a third step s130, sampling values using the adapted MSAA scheme to render the one or more respective pixels indicated by the 2×2 pixel mask, so as to generate a region of the image comprising one or more rendered pixels and corresponding missing pixels, as described previously herein; and in a fourth step s140, dilating one or more of the respective pixels to fill in the one or more missing pixels within the region of the image, as described previously herein.

In an instance of this summary embodiment, the number of masked pixels defined in the 2×2 pixel mask increases as a function of the distance of the region of the image from the centre of the image, as described previously herein.

In this case, optionally a predefined 2×2 pixel mask comprising one, two, or three masked pixels is selected as a function of the distance of the region of the image from the centre of the image, as described previously herein.

In an instance of this summary embodiment, the pattern of the defined 2×2 pixel mask changes in each successive frame, as described previously herein.

In this case, optionally the pattern of the defined 2×2 pixel mask rotates by 90° in each successive frame, as described previously herein.

In an instance of this summary embodiment, the method further comprises the steps of inputting the region of the image in a plurality of successive frames in to a temporal anti-aliasing filter; and a step of using the output of the temporal anti-aliasing filter as the region of the image for an output generated image, as described previously herein.

In an instance of this summary embodiment, the method further comprises the step of detecting whether the region of the image corresponds to a feature in the image indicated as being important, and one step selected from the list consisting of bypassing the steps of the method as described above within the summary embodiment, and alternatively selecting a 2×2 pixel mask with fewer masked pixels than a default 2×2 pixel mask that would be selected for that region of the image, as discussed previously herein.

In an instance of this summary embodiment, the method further comprises the steps of detecting whether the region of the image corresponds to a feature in the image indicated as being unimportant, and selecting a 2×2 pixel mask with more masked pixels than a default 2×2 pixel mask, if any, that would be selected for that region of the image, as discussed previously herein.

FIG. 21 schematically illustrates example hardware which may be used to implement the current techniques, and relates to apparatus features shown schematically in FIGS. 8 and 9. The HMD device 320 is connected to the optional break out box 350 by the cable(s) 82, 84, with each of the HMD and break out box containing a processing unit (321,351 respectively) and a memory unit (322, 352 respectively). The break out box is then further connected to a video source 350, for example a games console, via further cable(s) 82, 84. The video source also has its own processor 301 and memory unit 302. The processing of the image as described above may be carried out by any of the three processors (301,321, 351) in conjunction with their respective memory unit, or may be distributed amongst them. However, the present techniques lend themselves to being carried out by the processor 301, that is to say the process is carried out at the Video Source 300. In addition the hardware may be arranged without the break out box 350, such that the HMD 320 may be directly connected to the video source 300.

FIG. 21 therefore provides an example of an image processing apparatus operable to process an image generated for display by a head mountable display device in accordance with the above-described methods.

Hence in a summary embodiment of the present invention, an image processing apparatus (such as one of the videogame controller, breakout box and HMD 300, 320, 350) is operable to process an image generated for display by the head mountable display device. The apparatus comprises a mask processor (for example a CPU 301, 321, 351 of one or more of the respective devices operating under suitable software instruction) adapted to define a 2×2 pixel mask pattern for a region of the image, indicating the location of one or more pixels and corresponding masked pixels within the 2×2 pixel mask pattern; an aliasing processor (again for example a CPU 301, 321, 351 of one or more of the respective devices operating under suitable software instruction) adapted to modify a multi-sample anti-aliasing (MSAA) scheme to sample at one quarter resolution on a regular grid; the aliasing processor being operable to sample values using the modified MSAA scheme to render the one or more respective pixels indicated by the 2×2 pixel mask, so as to generate a region of the image comprising one or more rendered pixels and corresponding missing pixels; and a dilating processor (again for example a CPU 301, 321, 351 of one or more of the respective devices operating under suitable software instruction) adapted to dilate one or more of the respective pixels to fill in the one or more missing pixels within the region of the image.

Various instances of this embodiment are envisaged to correspond with instances of the summary embodiment of the method described previously herein.

Hence, in an instance of this embodiment, the number of masked pixels defined in the 2×2 pixel mask increases as a function of the distance of the region of the image from the centre of the image.

Similarly in an instance of this embodiment, the pattern of the defined 2×2 pixel mask changes in each successive frame.

And again in an instance of this embodiment, the apparatus comprises a temporal anti-aliasing processor, and the temporal anti-aliasing filter is operable to receive as input the region of the image in a plurality of successive frames and to output a corresponding region of the image for use as a region of the output generated image.

It will be appreciated that the above methods may thus be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Annex

Further notes on the techniques described herein.

In accordance with embodiments of the present invention, the inventors mask out pixels in a temporally varying dither pattern throughout the rendered image, with increasing density of masking towards the outside of the image. Subsequent render-passes then dilate the surrounding pixels into the masked out areas to fill in the gaps, or alternatively adjust the sample positions to sample from valid locations. The rendered results are accumulated over multiple frames to ensure contributions from all screen-pixels—trading temporal for spatial resolution. In addition, quad-overdraw performance limitations are worked around, which would otherwise force this masking to be done at 2×2 pixel granularity, by taking advantage of the interleaved pixel quad packing employed by 4× multi-sampled anti-aliasing—allowing masking at pixel granularity, significantly enhancing the resulting quality.

As noted previously herein, the distortions applied in the process of getting a game output image into the view experienced by the user in the HMD headset (a barrel distort applied by the system, and a pin-cushion distort applied by the optics), result in the effective resolution of the image, as experienced by the user, varying across the image. To take advantage of this, one can render at higher resolution in the centre of the image (×1.4 in each axis) and also have the opportunity to save rendering time by rendering at lower resolution at the image periphery. Typically graphics hardware does not natively support rendering at spatially varying resolution, so the herein described technique approximates this.

Notably, embodiments of the present invention temporally vary the masking pattern to allow averaging of contributions from all screen pixels over the course of four frames. These are accumulated in a temporal anti-aliasing pass with some minor alterations. This allows a trade of temporal for spatial resolution where appropriate to get a higher quality (less aliased) image.

Embodiments of the present invention take advantage of the interleaved pixel quad packing behaviour of 4× multi-sampled anti-aliasing (4×MSAA) to enable masking at pixel granularity without incurring the cost of quad overdraw (which could have limited the benefits of the technique). This adapts various features of MSAA to support this, rendering outputting to the same resolution render-target as before by using sample-frequency shading, and adjusting the sample positions to match the non-MSAA pattern.

MSAA is traditionally used to anti-alias triangle edges, by taking multiple samples at those locations. However, by forcing the samples to be drawn in a grid pattern, rather than the usual rotated quad, and discarding samples using the masking pattern, one can effectively use 4× multisampling to get a half res render target to display at full res in the center, and at increasingly low resolutions at the edges according to the pattern.

In embodiments of the present invention, the result of the MSAA render is the image with black holes in from the missing samples—essentially treating the multi-sampled low res image as a high resolution one. The blending of missing samples is done as a dilation post process, where an adjacent valid sample is found and used to fill the holes.

MSAA works by rasterising multiple samples per pixel but only shading once and using that for all samples (subject to passing a depth test etc). This higher rate of rasterisation gives higher resolution edges but makes no difference to shading resolution within a primitive.

However, instead of shading at "pixel rate" as above, embodiments of the present invention shade at "sample rate" instead. This means that the pixel shader is run for every sample within each pixel, rather than just running once. So if one uses 4×MSAA and render at sample rate, and reduce the resolution to half in each axis, then one has the same number of pixels in the image. If one additionally adjusts the MSAA sample locations into a grid pattern, then after the MSAA resolve one has an almost identical image to one without the MSAA adaptation (ignoring rounding errors).

Hence one may render at 4×MSAA at sample frequency (adjusting MSAA sample positions) and at IA res (½×½), but still see the same number of samples, but the samples that make up the quad are further apart in the resolved image.

Hence the pixel quads are now constructed of different "samples" (pixel quads for MSAA are constructed so that the samples are in a rectangular grid to simplify gradient calculation.

As noted above, in embodiments of the present invention the result of the resolved MSAA output still has the holes in it. The holes are copied over using the closest valid pixel(s) and then temporal anti-aliasing, by its nature, accumulates the results of the last few frames, ensuring a contribution from each pixel over the course of 4 frames.

Rather than having a separate pass to dilate nearby pixels into the masked pixels, embodiments of the present invention can save bandwidth by performing these reads on demand. This trades a bit of extra ALU, which is largely hidden by other latency in the shader, to save bandwidth reading and writing textures. In addition because the sampling is from the masked version it actually samples less pixels in total, which is more performant as the access patterns are more cache-friendly.

The technique also supports the facility to have an arbitrary masking pattern—not just one that gets denser towards the outside of the image. So for example, one can control the masking pattern to ensure objects of interest—e.g. character faces—are always high resolution, or lower frequency details—e.g. smoke effects—are always lower resolution.

Furthermore, this application could also be applied to traditional non-VR games, even without the motivating distortion effects described above. Hence whilst the herein described image processing method for generating an image is suitable for display by a head mountable display device, it will be appreciated that it is not essential that it be displayed by a head mountable display device, since as described herein there are other circumstances in which variable effective resolution rendering may be beneficially employed to reduce computational overhead.

The invention claimed is:

1. An image processing method for an image generated for display by a head mountable display device, the method comprising the steps of:

defining a 2×2 pixel mask pattern for a region of the image, indicating the location of one or more pixels and corresponding masked pixels within the 2×2 pixel mask pattern;

adapting a multi-sample anti-aliasing (MSAA) scheme to sample at one quarter resolution on a regular grid;

sampling values using the adapted MSAA scheme to render the one or more respective pixels indicated by the 2×2 pixel mask, so as to generate a region of the image comprising one or more rendered pixels and corresponding missing pixels; and dilating one or more of the respective pixels to fill in the one or more missing pixels within the region of the image, wherein the number of masked pixels defined in the 2×2 pixel mask increases as a function of a distance of the region of the image from a centre of the image.

2. The image processing method of claim 1, in which a predefined 2×2 pixel mask comprising one, two, or three masked pixels is selected as a function of the distance of the region of the image from the centre of the image.

3. The image processing method of claim 1, in which the pattern of the defined 2×2 pixel mask changes in each successive frame.

4. The image processing method of claim 3, in which the pattern of the defined 2×2 pixel mask rotates by 90° in each successive frame.

5. The image processing method of claim 1, comprising the steps of:

inputting the region of the image in a plurality of successive frames in to a temporal anti-aliasing filter; and using the output of the temporal anti-aliasing filter as the region of the image for an output generated image.

6. The image processing method of claim 1, comprising the step of:

detecting whether the region of the image corresponds to a feature in the image indicated as being important; and one step selected from the list including:
i. bypassing the steps of the method in any preceding claim; and
ii. selecting a 2×2 pixel mask with fewer masked pixels than a default 2×2 pixel mask that would be selected for that region of the image.

7. The image processing method of claim 1, comprising the steps of:

detecting whether the region of the image corresponds to a feature in the image indicated as being unimportant; and selecting a 2×2 pixel mask with more masked pixels than a default 2×2 pixel mask that would be selected for that region of the image.

8. A machine-readable, non-transitory storage medium which stores computer software, which when executed by a computer system, causes the computer system to carry out actions for generating an image for display by a head mountable display device, actions comprising:

defining a 2×2 pixel mask pattern for a region of the image, indicating the location of one or more pixels and corresponding masked pixels within the 2×2 pixel mask pattern;

adapting a multi-sample anti-aliasing (MSAA) scheme to sample at one quarter resolution on a regular grid;

sampling values using the adapted MSAA scheme to render the one or more respective pixels indicated by the 2×2 pixel mask, so as to generate a region of the image comprising one or more rendered pixels and corresponding missing pixels; and dilating one or more of the respective pixels to fill in the one or more missing pixels within the region of the image, wherein the number of masked pixels defined in the 2×2 pixel mask increases as a function of a distance of the region of the image from a centre of the image.

9. An image processing apparatus (300, 320, 350) operable to process an image generated for display by a head mountable display device, the apparatus comprising:

a mask processor (301, 321, 351) adapted to define a 2×2 pixel mask pattern for a region of the image, indicating the location of one or more pixels and corresponding masked pixels within the 2×2 pixel mask pattern;

an aliasing processor (301, 321, 351) adapted to modify a multi-sample anti-aliasing (MSAA) scheme to sample at one quarter resolution on a regular grid;

the aliasing processor being operable to sample values using the modified MSAA scheme to render the one or more respective pixels indicated by the 2×2 pixel mask, so as to generate a region of the image comprising one or more rendered pixels and corresponding missing pixels; and a dilating processor (301, 321, 351) adapted to dilate one or more of the respective pixels to fill in the one or more missing pixels within the region of the image, wherein the number of masked pixels defined in the 2×2 pixel mask increases as a function of a distance of the region of the image from a centre of the image.

10. The image processing apparatus of claim 9, in which the pattern of the defined 2×2 pixel mask changes in each successive frame.

11. The image processing apparatus of claim 9, comprising a temporal anti-aliasing processor; and in which the temporal anti-aliasing filter is operable to receive as input the region of the image in a plurality of successive frames, and the temporal anti-aliasing filter is operable to output a corresponding region of the image for use as a region of the output generated image.

\* \* \* \* \*